US012717926B2

(12) United States Patent
Achleitner et al.

(10) Patent No.: US 12,717,926 B2
(45) Date of Patent: Aug. 25, 2026

(54) AUTOMATED IDENTIFICATION OF VULNERABLE SOFTWARE COMPONENTS

(71) Applicant: Dynatrace LLC, Waltham, MA (US)

(72) Inventors: Stefan Achleitner, Vienna (AT); Simon Ammer, Linz (AT); Benjamin Buzek, Kematen an der Ybbs (AT)

(73) Assignee: Dynatrace LLC, Boston, MA (US)

( * ) Notice: Subject to any disclaimer, the term of this patent is extended or adjusted under 35 U.S.C. 154(b) by 283 days.

(21) Appl. No.: 18/603,333

(22) Filed: Mar. 13, 2024

(65) Prior Publication Data

US 2024/0427902 A1 Dec. 26, 2024

Related U.S. Application Data

(60) Provisional application No. 63/521,964, filed on Jun. 20, 2023.

(51) Int. Cl.

| | |
|---|---|
| ***G06F 21/57*** | (2013.01) |
| ***G06F 8/65*** | (2018.01) |
| ***G06F 21/50*** | (2013.01) |
| ***G06F 21/56*** | (2013.01) |
| ***G06F 40/295*** | (2020.01) |
| ***G06N 20/00*** | (2019.01) |

(52) U.S. Cl.
CPC .............. *G06F 21/577* (2013.01); *G06F 8/65* (2013.01); *G06F 21/563* (2013.01); *G06F 40/295* (2020.01)

(58) Field of Classification Search
None
See application file for complete search history.

(56) References Cited

U.S. PATENT DOCUMENTS

| | | | | |
|---|---|---|---|---|
| 12,153,684 | B2 * | 11/2024 | Chan | G06F 21/577 |
| 2019/0050574 | A1 * | 2/2019 | Abraham | G06F 21/577 |
| 2020/0057858 | A1 * | 2/2020 | Sharma | G06F 21/563 |
| 2020/0074084 | A1 * | 3/2020 | Dorrans | G06F 21/577 |

(Continued)

OTHER PUBLICATIONS

Bhandari Guru et al: "CVEfixes: automated collection of vulnerabilities and their fixes from open-source software", Multimedia Understanding With Less Labeling on Multimedia Understanding With Less Labeling, ACMPUB27, New York, NY, USA, Aug. 19, 2021.

*Primary Examiner* — Christopher B Robinson
(74) *Attorney, Agent, or Firm* — Harness, Dickey & Pierce, P.L.C.

(57) ABSTRACT

A computer-implemented method is presented for identifying vulnerable software from a computer system. The method includes: identifying name of a given software component in a vulnerability database by analyzing text of an entry in the vulnerability database using a large language model, where entries in the vulnerability database have known vulnerabilities; identifying a patch for the given software component in a source code repository by analyzing text of the entry in the vulnerability database using the large language model; identifying the patch for the given software component in the source code repository by analyzing text in the source code repository using the large language model; and reporting the given software component as being vulnerable in response to identifying the patch for the given software component in the source code repository.

19 Claims, 11 Drawing Sheets

(56) References Cited

U.S. PATENT DOCUMENTS

Figure 1:
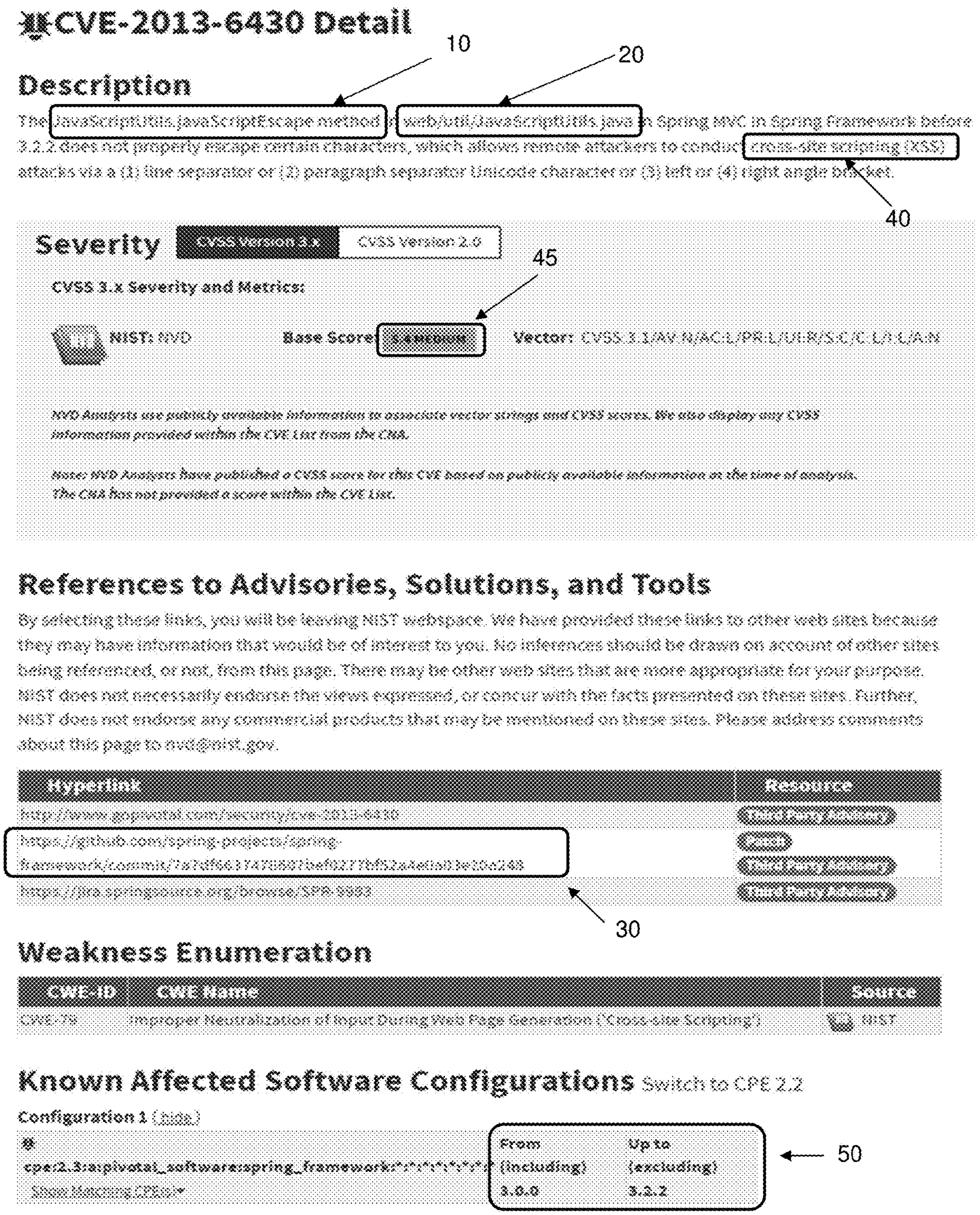

| | | | | |
|---|---|---|---|---|
| 2020/0242254 | A1 | 7/2020 | Velur et al. | |
| 2022/0004642 | A1* | 1/2022 | Pujar | G06F 21/577 |
| 2022/0060497 | A1* | 2/2022 | Crabtree | G06N 20/00 |
| 2022/0108020 | A1* | 4/2022 | Dang | G06F 21/563 |
| 2024/0411666 | A1* | 12/2024 | Chan | G06F 11/3624 |

* cited by examiner

90

AUTOMATED IDENTIFICATION OF VULNERABLE SOFTWARE COMPONENTS

CROSS-REFERENCE TO RELATED APPLICATIONS

This application claims the benefit of U.S. Provisional Application No. 63/521,964, filed on Jun. 20, 2023. The entire disclosure of the above application is incorporated herein by reference.

FIELD

The disclosure concerns the field of information technology. In particular, the disclosure concerns the automated identification of vulnerable software components, e.g. one or multiple functions, or one or multiple classes, where each class comprises at least one function, through source-code or bytecode parsing and text analysis. The identified software components shall be considered to be affected by one or more Common Vulnerabilities and Exposures, short CVE. A Large Language Model, short LLM, is used to perform code parsing and text analysis. Examples of LLMs are OpenAI's GPT 3, GPT 3.5, or GPT 4 models (as for example used in ChatGPT), Google's LaMDA or Bard models, or the LLAMA model from Meta AI. Multiple other models exist, and it is assumed that many more will become available in future. All of these models provide artificial intelligence (short AI) functionality based on transformer architecture-based models, such as Generative pre-trained transformer (short GPT) models.

BACKGROUND

In the prior art, the extraction of CVE affected software code is done manually. In case a new vulnerability of a software component is detected, the vulnerability is added to a vulnerability database. One well known vulnerability database is the NATIONAL VULNERABILITY DATABASE (NVD) provided by the National Institute of Standards and Technology (NIST). Many other vulnerability databases, also called CVE databases, hosted by different institutions in different countries, exist. After detecting the vulnerability, the software component causing the vulnerability needs to be identified. Typically, an end-user of software cannot identify the vulnerable software component for lack of technical competency and due to the fact that the end-user can access the machine—or bytecode of the software only. In order to find the root cause of a vulnerability, the source-code of the vulnerable software component needs to be analyzed. Currently, many software products are at least partially based on open-source software components, such as packages, classes, functions/methods or software libraries. The advantages of open-source software are widely acknowledged due to the broad availability of different software components in many different programming languages for many different use cases. In addition to the readily availability of such components, advanced functionalities exist, such as references from a vulnerability database to a source-code repository hosting the source-code, such as GitHub, Bitbucket etc. Typically, developers of the vulnerable software component identify the cause of the vulnerability. In some cases, the developers are supported by security researchers. After identifying the vulnerability, efforts are made to remedy the vulnerability. In most cases, an updated version of the affected software component is published at the source-code repository (called "commit"), and in addition, a link to the CVE identifying the vulnerability is posted. As can be seen from the above, this process involves many different manual steps, involves different stakeholders (software developers, security researchers, database providers, source-code repositories . . . ), and is based on information from different sources.

The above process of extracting vulnerable software components is sometimes performed by specialized companies providing security information to interested parties, such as software developers. Such companies provide security feeds to interested parties listing detailed information about vulnerable software components, such as names of packages, classes, functions, affected versions etc. These security feeds are compiled for one or few of the most widely used programming languages, e.g. Java and JavaScript, such that there is a need to cover additional languages, such as Go, C#, .NET, Rust, PHP etc. In addition, there is a need to shorten the process of extracting vulnerable software components and to improve the quality of the data output.

How this process can be automated and how the quality of the identified vulnerable software components can be improved is not known in the prior art. In particular, the time from detecting a new vulnerability to patching of affected software components or mitigating the risk shall be reduced and/or the quality of the information shall be improved.

This section provides background information related to the present disclosure which is not necessarily prior art.

SUMMARY

The objective of the disclosure is to find a process for the automatic identification of vulnerable software components through source-code or bytecode parsing and text analysis. By automating the process of vulnerable function extraction, manual work shall be reduced to a minimum. The quality of identified CVE affected software components shall be increased by combining results from multiple, independent sources. Note that one single data-source cannot assumed to be correct, as function names in CVEs might be misspelled or simply be wrong, a commit to a source-code repository, such as GitHub, patching a vulnerability may contain not only code changes related to the CVE but also unrelated changes etc.

According to a first aspect of the disclosure, this objective is solved by a computer-implemented method for identifying vulnerable software from a computer system, comprising: identifying name of a given software component in a vulnerability database by analyzing text of an entry in the vulnerability database using a large language model, where entries in the vulnerability database have known vulnerabilities; identifying a patch for the given software component in a source code repository by analyzing text of the entry in the vulnerability database using the large language model; identifying the patch for the given software component in the source code repository by analyzing text in the source code repository using the large language model; and reporting the given software component as being vulnerable in response to identifying the patch for the given software component in the source code repository.

According to this aspect of the disclosure, a large language model (LLM) is used to identify i) the name of a given software component in a vulnerability database, ii) identify a patch for the software component in a source-code repository by analyzing the text in the entry for the respective CVE in the vulnerability database, and iii) identify the patch in the source-code repository. In case the patch mentioned in the vulnerability database is found in the source code repository, the given software component is considered to be a vulnerable software component. In such case, the software component is reported as a vulnerable software component to the method customer (step iv).

The large language model (short LLM) is e.g., a transformer architecture-based model, such as a generative pre-trained transformer (short GPT) model. In order to improve the quality of the outputs provided by the LLM, the LLM is a pre-trained model, and the pre-trained model is preferably further adapted by at least one of fine-tuning the model and few-shot learning. The adaptation can use at least one of the following prompting techniques: Standard Prompting, Chain-of-Thought Prompting, Least-to-Most Prompting, and Reasoning-and-Acting Prompting.

In the first step, the name of the software component affected by the CVE is identified by analyzing the entry in a vulnerability database, such https://nvd.nist.org, using the LLM. It is noted that the vulnerability database comprises many entries for different software components and different vulnerabilities.

In the next step, a patch for the given software component is identified in a source-code repository, such as https://github.com. The patch is identified by analyzing the entry in the vulnerability database using the LLM.

In the subsequent step, it is checked whether the patch mentioned in the vulnerability database is actually present in the source-code repository. E.g., the link from the vulnerability database to the source-code repository is followed. In many cases, the names of the software components amended by the patch are extracted.

In case the patch mentioned on the vulnerability database is actually present on the source code repository, the software component is reported as a vulnerable software component to the method customer.

As already mentioned, it is advantageous to identify the patch for the given software component by matching the name of the given software component in the vulnerability database to the name of the given software component in the source code repository. In this case, it is not just checked that the patch mentioned in the vulnerability database is present in the source code repository, but to additionally check whether the name of the software component in the vulnerability database matches the name of the software component in the source code repository. By doing this, the quality of identified vulnerable software components is increased.

According to another advantageous embodiment of the disclosure, the method further comprises the steps of: identifying the type of vulnerability associated with the given software component by analyzing text in the vulnerability database using the large language model; identifying the type of vulnerability associated with the given software component by analyzing text of the unpatched code of the software component in the source code repository using the large language model; and reporting the given software component as being vulnerable in response to the name of the given software component in the vulnerability database matching the name of the given software component in the source code repository, and the type of vulnerability associated with the given software component in the vulnerability database matching the type of vulnerability associated with the given software component in the source code repository.

The type of vulnerability can be analyzed by text analysis of the unpatched file or by text analysis of the unpatched and the patched file. In the first case, the LLM analyzes the vulnerable file and identifies the type of vulnerability. In the latter case, additionally the patched file is taken into account, which increases the probability that the right type of vulnerability is identified. For both cases, the probability of having identified a vulnerable software component is increased further.

In response to having identified a vulnerable software component on a computer system, the vulnerability is preferably removed by patching the software component on the computer system.

In order to increase the quality of outputs provided by the large language model (LLM), the LLM is adapted using one of standard prompting, chain-of-thought prompting, least-to-most prompting or reasoning-and-acting prompting.

According to another preferred embodiment, topology entities from a topology model, e.g. a graph with nodes in the graph representing topology entities in a distributed computer system and edges of the graph representing relationships between the topology entities, are retrieved for the vulnerable software component, and the retrieved topology entities are reported along with the given software component.

The aforementioned embodiment allows the identification of applications, hosts, data centers or network regions containing the vulnerable software component.

According to another preferred embodiment, the method further comprises changing the network topology of the computer system in response to reporting topology entities as vulnerable such that the level of risk associated with the vulnerability is reduced by after changing the topology.

As it is not always possible to patch vulnerabilities right away, the risk of exploiting a vulnerability can be reduced/mitigated by changing the network topology of the computer system such that e.g., vulnerable components are no longer exposed to the internet. Doing so generally does not take away the need to patch vulnerabilities but reduces the risk in the meantime. Consider one vulnerable software component that can be reached from the internet via port 8080. Let us further assume that the vulnerability cannot be fixed right away or that currently no patch exists to fix the vulnerability. By changing the network topology such that the vulnerable software component can no longer be reached directly from the internet, the risk of exploiting the vulnerability can be reduced. E.g., a firewall can be placed before the vulnerable software component such that in order to access the vulnerable software component, the firewall is accessed first and only legit requests are forwarded to the vulnerable software component.

According to a second aspect of the disclosure, the objective technical problem is solved by a computer-implemented method for identifying vulnerable software from a computer system, comprising: identifying name of a given software component in a vulnerability database by analyzing text of an entry in the vulnerability database using a large language model, where entries in the vulnerability database have known vulnerabilities; extracting a link to a patch for the given software component in a source code repository by analyzing text of the entry in the vulnerability database using the large language model; identifying name of the given software component in the source code repository by analyzing text of the patch in the source code repository using the large language model; comparing name of the given software component in the vulnerability database to the name of the given software component in the source code repository; and reporting the given software component as being vulnerable in response to the name of the given software component in the vulnerability database matching the name of the given software component in the source code repository.

As the first step in the first and second embodiments are equal, no extra description is needed. In the second step, a link to a patch for the given software component in a source code repository is identified by the large language model through text analysis of the entry in the vulnerability database. After this, the name of the given software component in the source code repository is identified by the large language model by analyzing text of the patch in the source code repository. Typically, the text to be analyzed is source code. In case source-code is not available, decompiling, i.e. the reverse process to compiling, the bytecode produces source code. In this case, the analysis is based on source code produced by decompiling. After the third step, the name of the software component in the vulnerability database is compared to the name of the software component in the source code repository. Finally, the software component is reported as being vulnerable if the name of the given software component in the vulnerability database matches the name of the given software component in the source code repository.

The accuracy of identifying vulnerable software components can be increased further by additionally identifying the type of vulnerability associated with the given software component by the large language model through text analysis of the entry in the vulnerability database. After this, the type of vulnerability of the software component is identified by the large language model through analyzing the unpatched source code of the software component in the source code repository. Following these analysis steps, the software component is reported as being vulnerable in response to the name of the given software component in the vulnerability database matching the name of the given software component in the source code repository, and the type of vulnerability associated with the given software component in the vulnerability database matching the type of vulnerability associated with the given software component in the source code repository. As mentioned above, the identification of the type of vulnerability can be improved further by analyzing the source code of the patched software component in addition to the unpatched software component.

By identifying the type of vulnerability, the likelihood for having identified a vulnerable software component can be improved further. Instead or in addition to identifying and matching the type of vulnerability, the affected software configuration, i.e. a specific version of the vulnerable software component or a range of versions of the vulnerable software component, can be considered. Generally, the higher the number of matching conditions, the higher is the likelihood for having identified a vulnerable software component. In addition to identifying and matching the above conditions, the severity level of the CVE can be identified. By taking into account the severity level of the CVE, the customer of the computer-implemented method or the person/entity operating a computer system can judge whether immediate measures need to be taken, i.e. to shut down specific functions or classes, or a more relaxed path of action can be taken. In response to the identification of vulnerable software components, e.g., the network configuration of the computer system can be changed in order to disallow external access to the vulnerable software component. Doing so reduces the risk that the vulnerability is exploited and the computer system is illegally accessed by rouge parties.

In response to having identified a vulnerable software component on a computer system, the vulnerability is preferably removed by patching the software component on the computer system.

The accuracy of the large language model to come up with the asked information can be improved by adapting the large language model using one of standard prompting, chain-of-thought prompting, least-to-most prompting or reasoning-and-acting prompting.

By using pre-trained LLMs, it is possible to train them further for specific tasks. This can be done by fine-tuning the model, using few-shot learning, or by combining both methods. Fine-tuning refers to using a pre-trained LLM that was initially trained on a large dataset and adjusting the model weights by training it again on a different dataset (usually a smaller dataset than the initial dataset). In comparison, few-shot learning uses a pre-trained LLM where the model is shown a few target examples (1 to N target examples are given) that train the model to the desired target task. Zero-shot learning is a type of few-shot learning in which the model is tested on data that was not included in training.

The extraction of function information from a CVE description can e.g. be done by few-shot learning of an LLM using different prompt engineering techniques. Each prompt engineering technique follows a different strategy to extract the function information (Standard prompting, Chain-of-Thought prompting, Least-to-Most prompting, Reasoning-and-Acting prompting). With Standard prompting, the model is given CVE descriptions and ideal function extraction answers as examples (<Description>;<Answer>). In comparison, Chain-of-Thought prompting (<Description>; <Chain-of-Thought>; <Answer>) uses multiple reasoning steps. Least-to-Most prompting follows the same strategy as Chain-of-Thought, with the difference that Least-to-Most contains multiple reasoning steps and intermediate answers (<Description>; <Chain-of-Thought>;<Intermediate-Answer>; <Chain-of-Thought>; <Answer>). Reasoning-and-Acting prompting include the same reasoning information as Chain-of-Thought with the addition of acting (<Description>; <Reasoning>; <Acting>; <Answer>).

According to another preferred embodiment, topology entities from a topology model, e.g. a graph with nodes in the graph representing topology entities in a distributed computer system and edges of the graph representing relationships between the topology entities, are retrieved for the vulnerable software component, and the retrieved topology entities are reported along with the given software component. By doing so, applications, hosts, data centers or network regions are identified containing the vulnerable software component.

Instead of patching vulnerable software components right away, the network topology of the computer system is changed in response to reporting topology entities as vulnerable such that the level of risk associated with the vulnerability is reduced by after changing the topology.

Preferably, different vulnerability databases, such as NVD, https://cve.mitre.org/, https://www.cvedetails.com/ are used as primary sources and further data sources, such as source-code repositories, are added.

Preferably reporting the given software component according to the first or second aspect of the disclosure further comprises: compiling, by the client computer, a list of vulnerable software components; for each entry in the list of vulnerable software components, adding identity data to each entry in the list of vulnerable software components; sending, by the client computer, the list of vulnerable software components to a monitoring server; and for each entry in the list of vulnerable software components, searching for a given entry in a server-side vulnerability database and storing the given entry, along with the identity data for the given entry, in the server-side vulnerability database in response to the absence of the given entry in the server-side vulnerability database.

By doing so, the disclosed methods compile a list of vulnerable software components. Identity data, e.g. hash values, are added to each entry in the list of vulnerable software components, and the list is sent to a monitoring server. Compiling the list of vulnerable software components and adding identity data, e.g. by hashing, are typically done as a background task. The list of vulnerable software components can be sent to at least one monitoring server. The monitoring server used the list to update the entries in a server-side, i.e. located on the monitoring server, vulnerability database.

Since hash values are typically small, e.g. 128-bit values, using hash values as identity data for the entry in the list of vulnerable software components, or identity data for the loaded/executed software component, or even the identity of the application, significantly reduces the amount of data being sent between the domains and enables accessing the server-side vulnerability database in order O(n). This allows the process for the detection of vulnerable software components to be executed in real-time.

After having updated server-side vulnerability database, the real-time monitoring of loading/executing vulnerable software component on a client-side application is done by: identifying execution of the given software component by a client-side application on the client computer; sending, by the client computer, identity data for the client-side application and identity data for the given software component the monitoring server; searching for the given software component in the server-side vulnerability database; and issuing a vulnerability report in response to the presence of the given software component in the server-side vulnerability database, where the vulnerability report includes the identity data for the given software component and the identity data for the client-side application.

According to a typical embodiment, the execution of the given software component is detected by one of an in-process agent instrumented in the client-side application or an OS agent instrumented in an operating system of the client computer. Generally, agents are used to instrument code that loads libraries for execution into monitored processes with loading sensors. Loading sensors detect and report the loading of libraries by monitored processes, extract data describing loaded libraries and send this data to a monitoring server for analysis. In-process agents may in addition place sensors to application programmable interfaces (APIs) provided by those libraries to execute provided library specific functionality. Operating system (OS) agents, on the other hand, run as separate processes on monitored operating system. Those OS agents may provide additional topology monitoring data for processes that are not or cannot be instrumented with in-process-agents. In addition, the OS agents may monitor file access and loading activities of such processes and report this data to a monitoring server.

According to a third aspect of the disclosure, the objective technical problem is solved by a non-transitory computer-readable medium having computer-executable instructions that, upon execution of the instructions by a processor of a computer, cause the computer to: identify name of a given software component in a vulnerability database by analyzing text of an entry in the vulnerability database using a large language model, where entries in the vulnerability database have known vulnerabilities; extract a link to a patch for the given software component in a source code repository by analyzing text of the entry in the vulnerability database using the large language model; identify name of the given software component in the source code repository by analyzing text of the patch in the source code repository using the large language model; compare name of the given software component in the vulnerability database to the name of the given software component in the source code repository; and report the given software component as being vulnerable in response to the name of the given software component in the vulnerability database matching the name of the given software component in the source code repository.

Further areas of applicability will become apparent from the description provided herein. The description and specific examples in this summary are intended for purposes of illustration only and are not intended to limit the scope of the present disclosure.

DRAWINGS

Figure 2A:
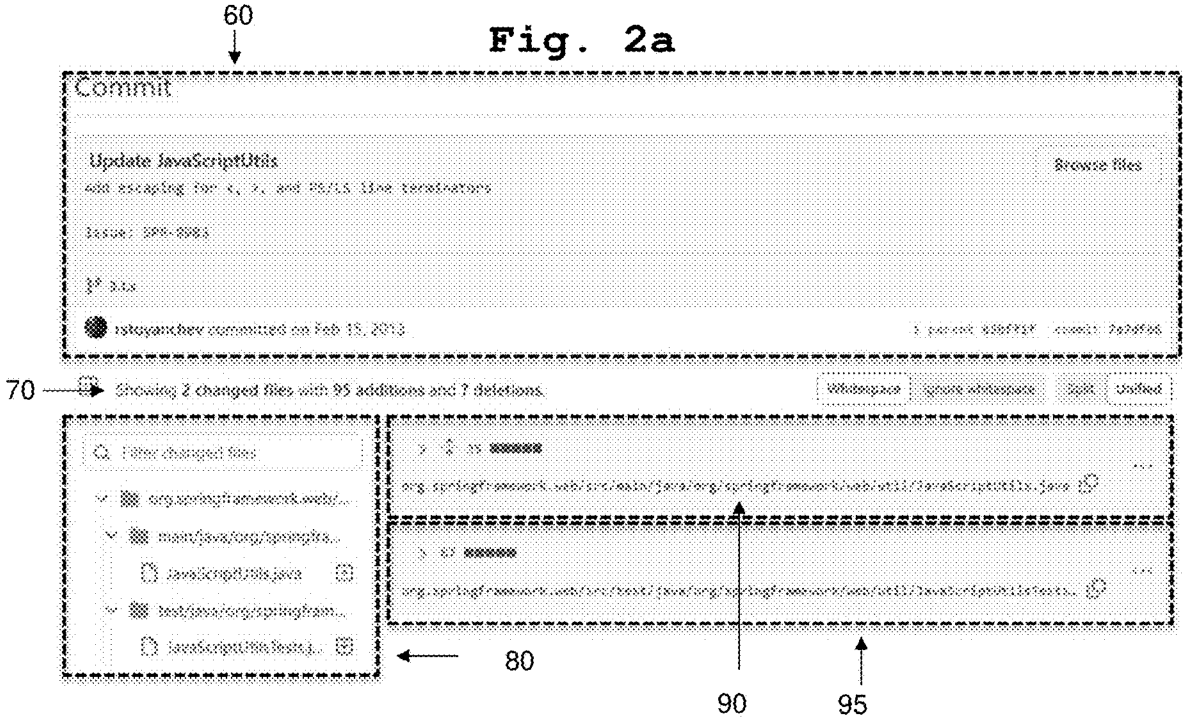
Figure 2C:
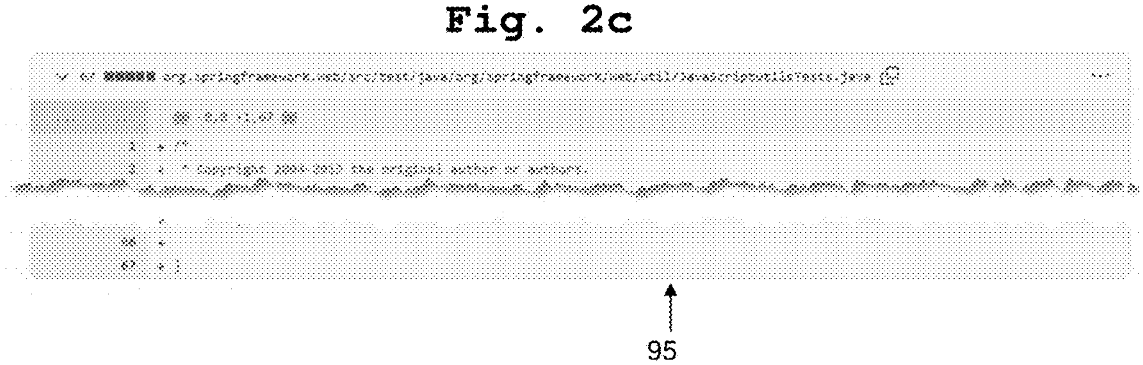
Figure 2B:
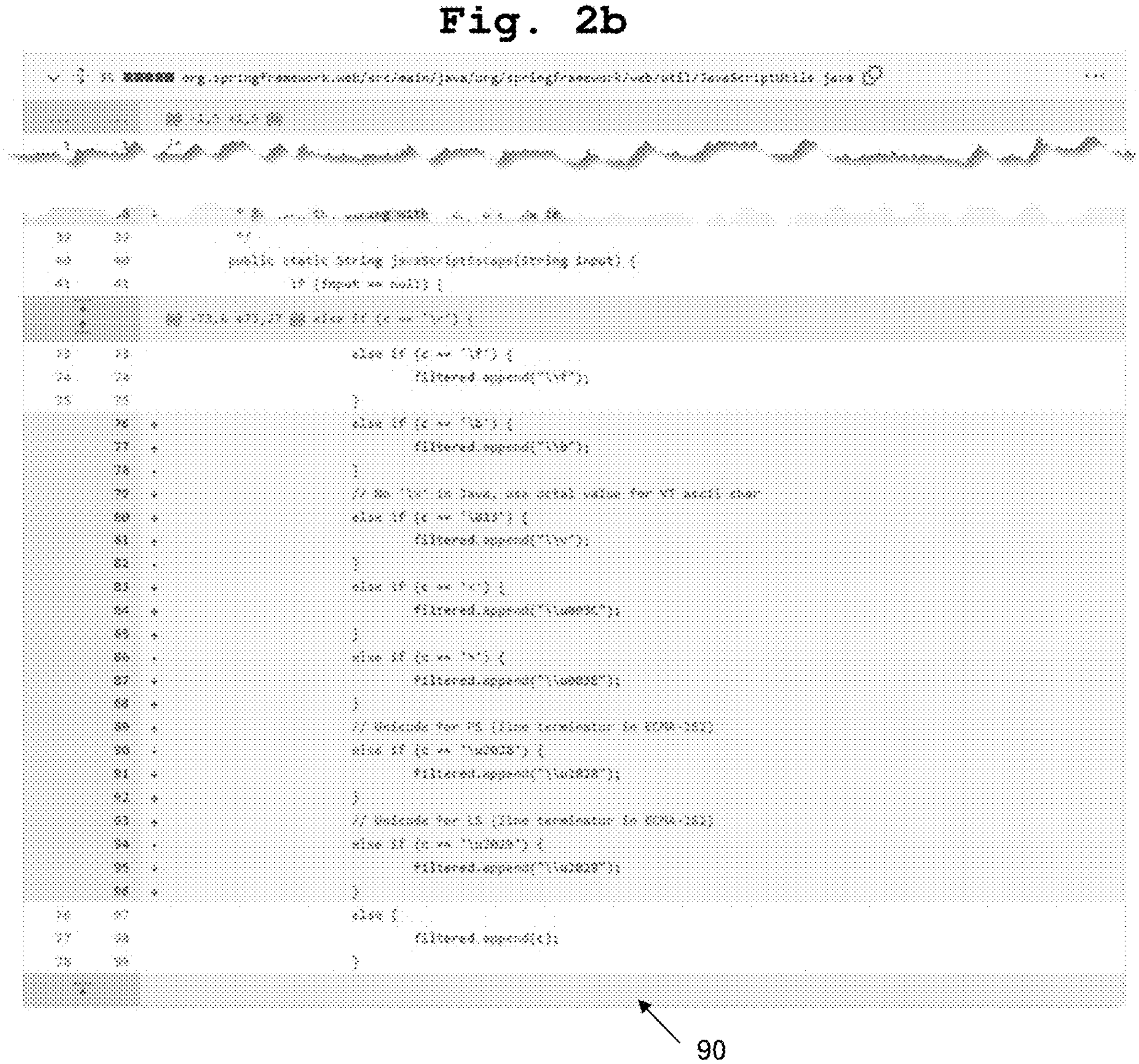
Figure 3:
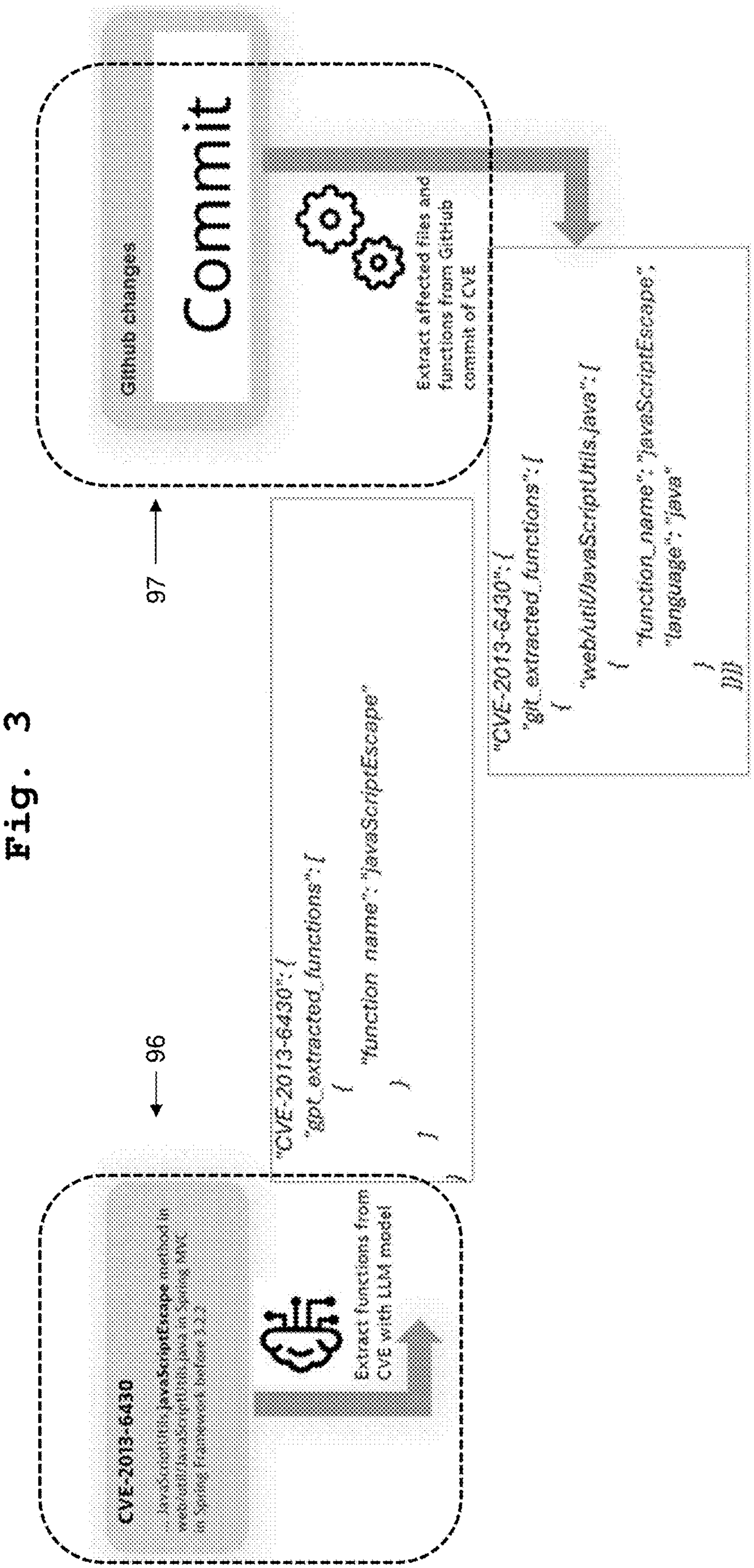
Figure 4:
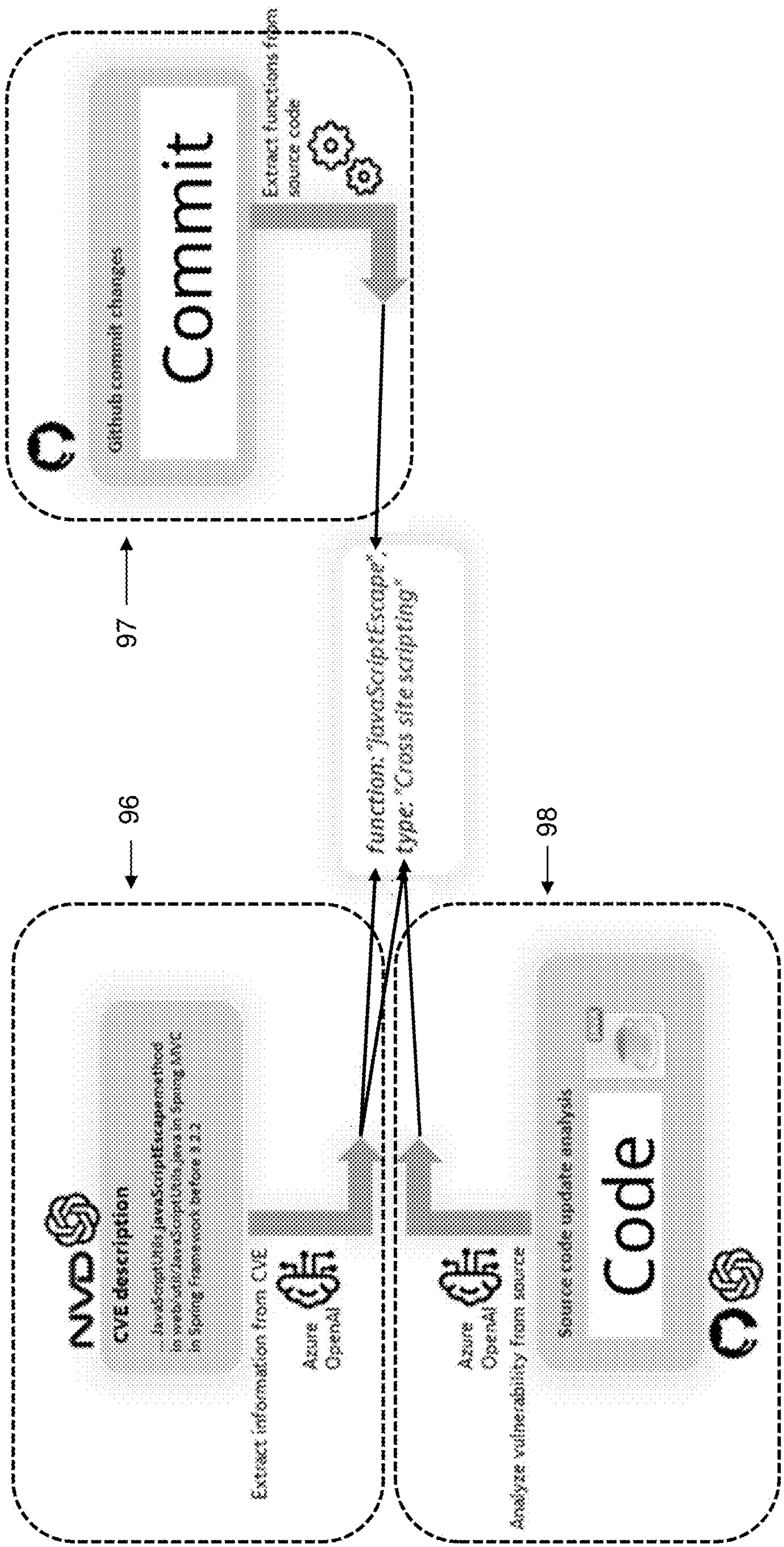
Figure 5:
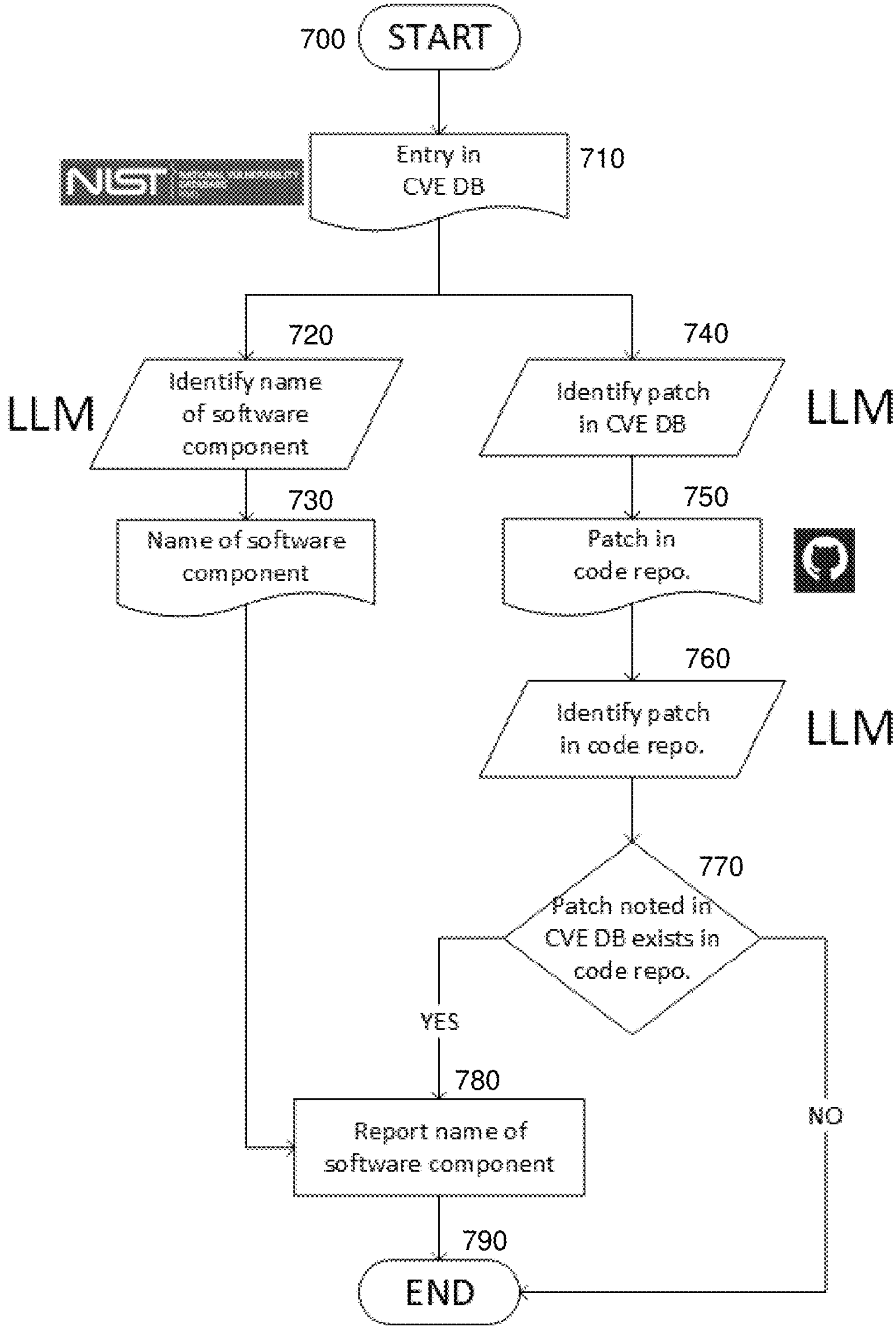
Figure 6:
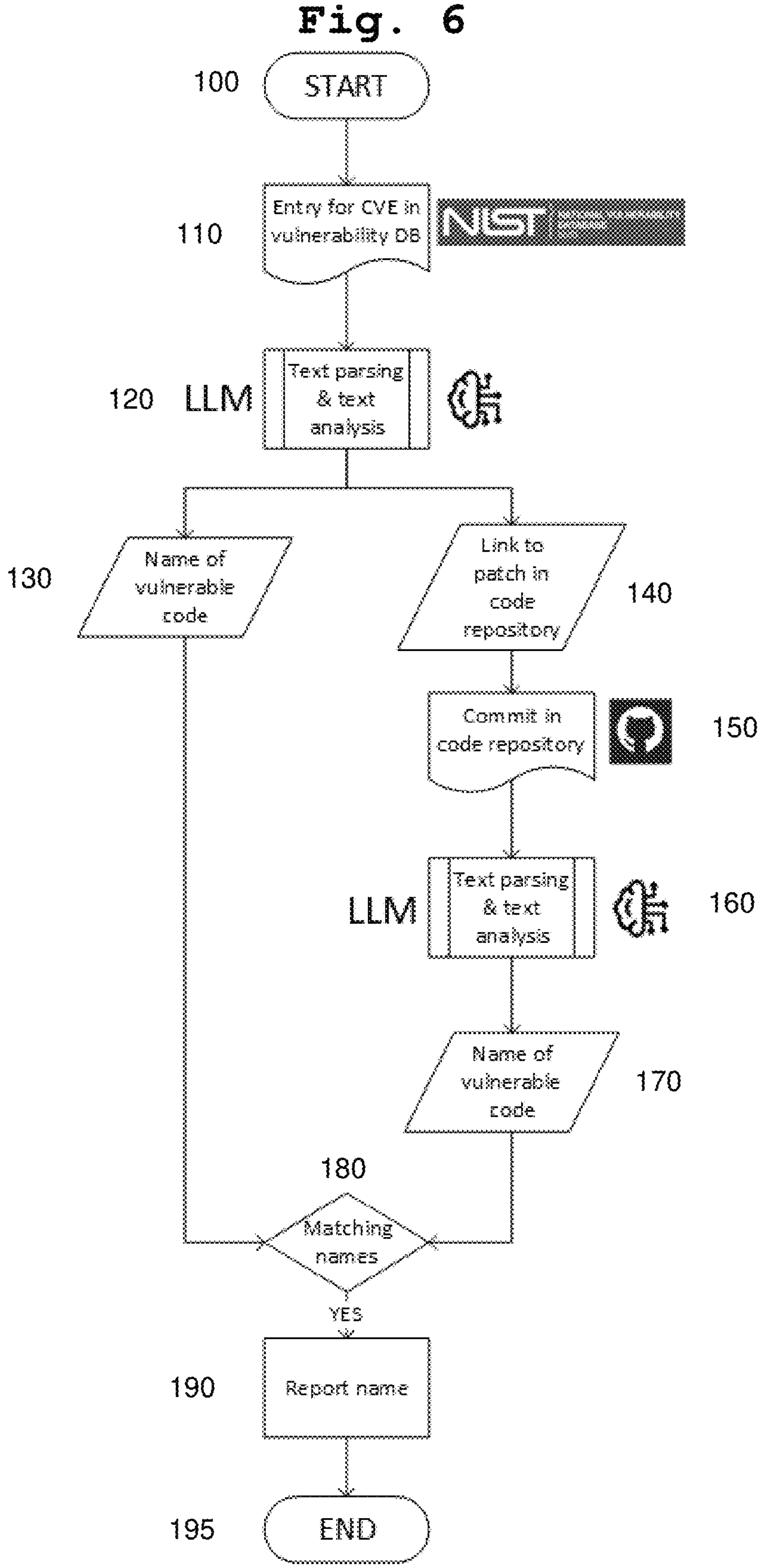
Figure 7:
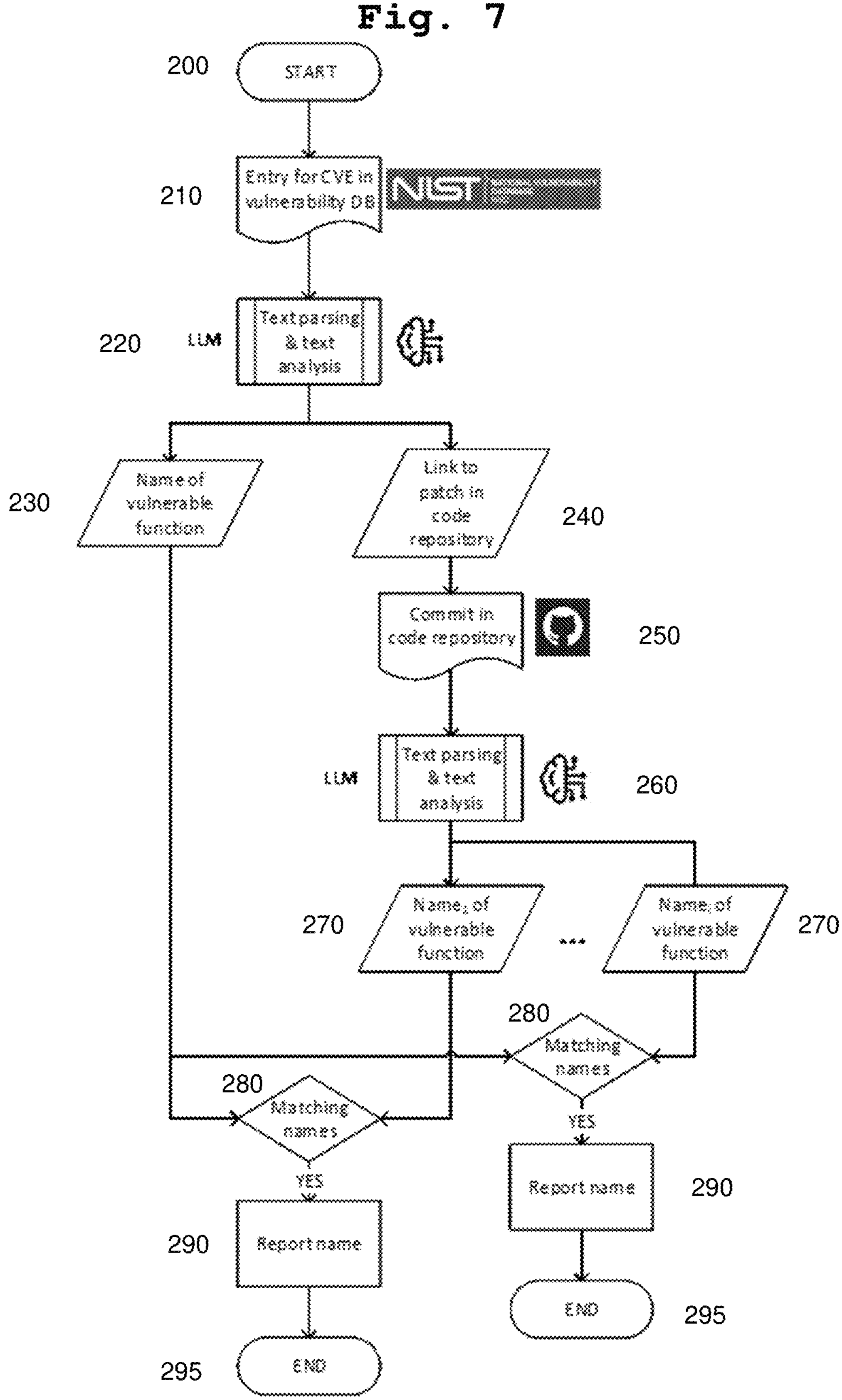
Figure 8:
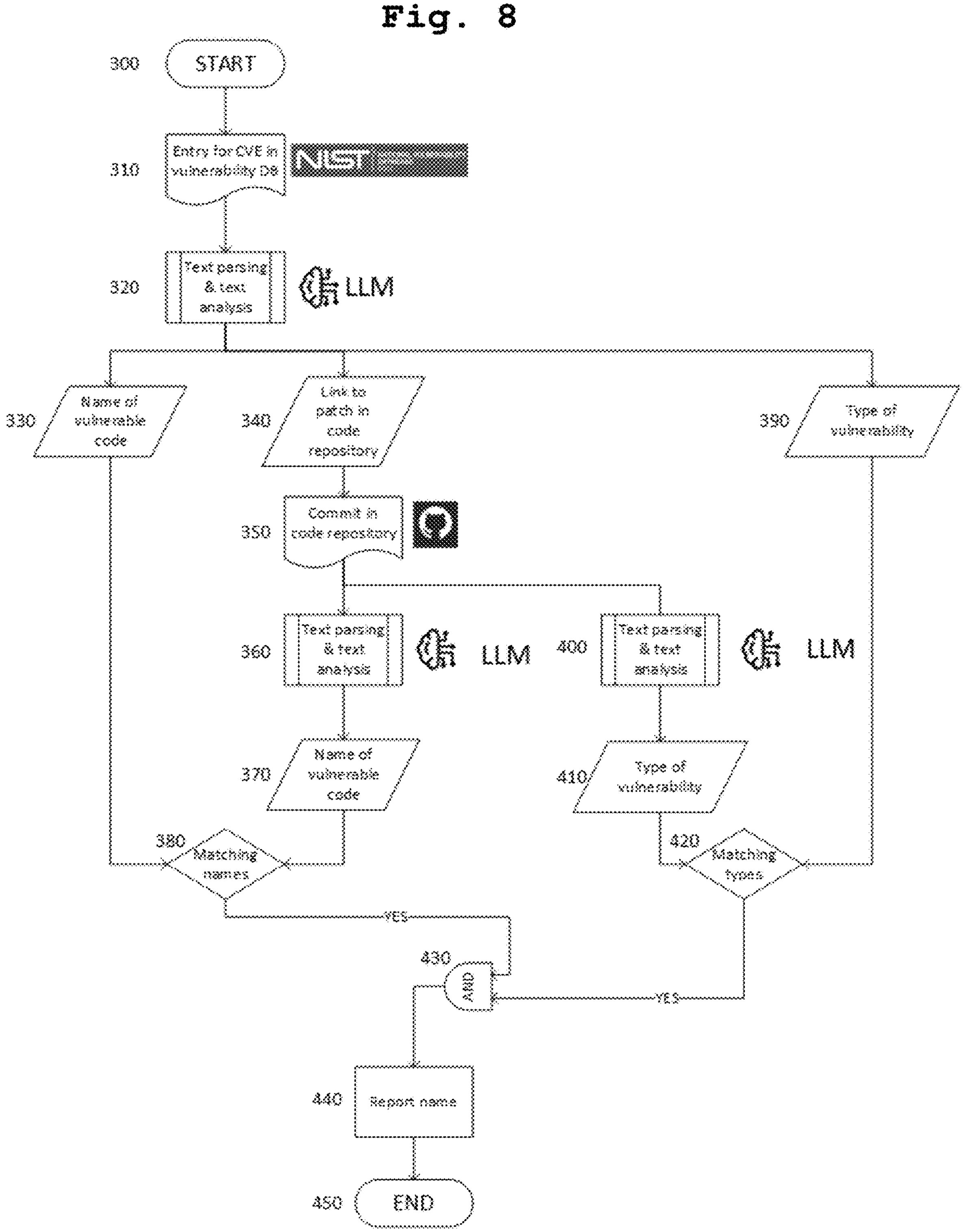
Figure 9A:
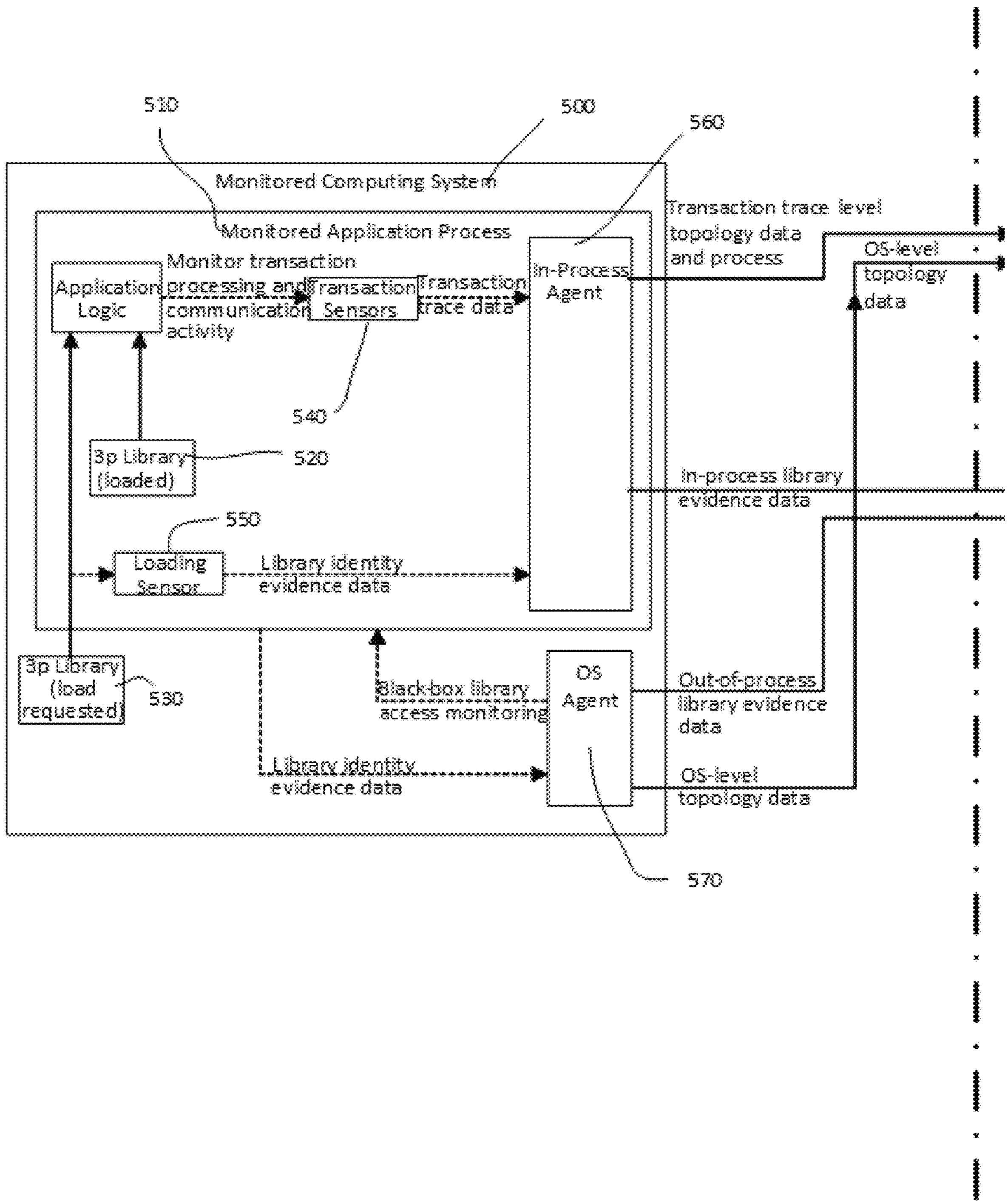
Figure 9B:
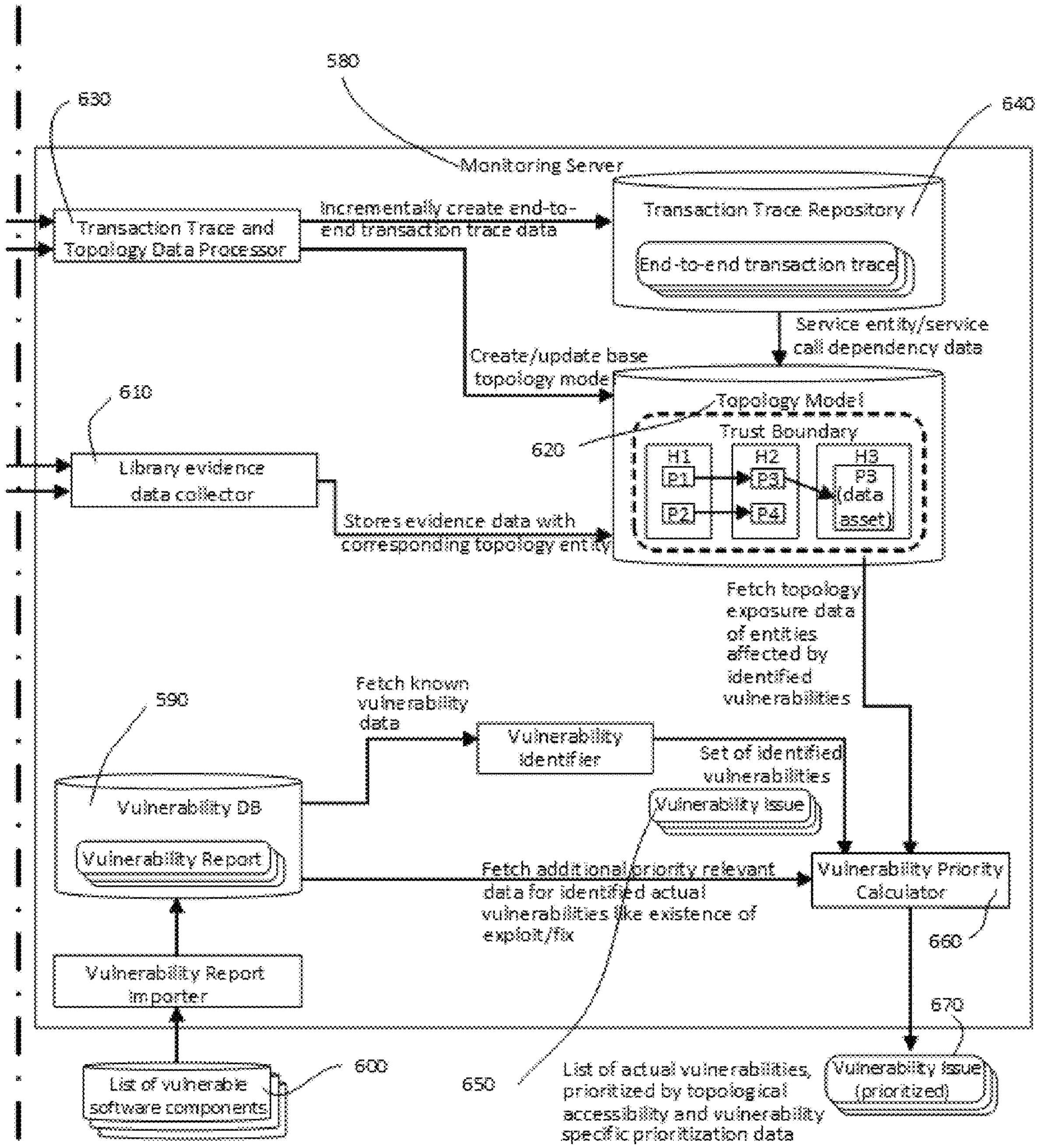

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein:

FIG. 1 shows the content of the entry CVE-2013-6430 on the NVD vulnerability database, FIGS. 2*a*, 2*b* and 2*c* partially show the content of the GitHub source-code repository for the patch linked to CVE-2013-6430, FIG. 3 shows steps for the identification of vulnerable code based on an entry in a vulnerability database and code amendment in a code repository, FIG. 4 shows steps for the identification of vulnerable code based on an entry in a vulnerability database, a code amendment in a code repository, and the analysis of the source-code before amendment, FIG. 5 shows a schematic with the main steps in the identification of vulnerable code according to the 1st aspect of the disclosure, FIG. 6 shows a schematic with the main steps in the identification of vulnerable code according to the 2nd aspect of the disclosure, FIG. 7 shows a first variant of the method according to FIG. 6, FIG. 8 shows a second variant of the method according to FIG. 6, FIGS. 9*a* and 9*b* show a schematic for the real-time detection of vulnerable software components on a client.

Corresponding reference numerals indicate corresponding parts throughout the several views of the drawings.

DETAILED DESCRIPTION

Example embodiments will now be described more fully with reference to the accompanying drawings.

A first example showing one embodiment of the disclosed method for the automatic identification of CVE affected source-code is described below:

This example is based on CVE-2013-6430 listed in the National Vulnerability Database https://nvd.nist.gov/vuln/ detail/CVE-2013-6430 hosted at the National Institute of Standard and Technology, see FIG. 1. From this textual information a LLM, such as ChatGPT 3.5, can extract:

i) the name of the software component affected by the CVE, ii) the link from the website to a code repository, and optionally at least one of the following iii) the type of vulnerability, iv) the affected software configuration, and v) the severity level of the CVE.

In FIG. 1, the name of the vulnerable software component is contained in field 10, the path to the Java class containing the vulnerable software component is contained in field 20, the link from the NVD to the GitHub code repository is given in field 30, the type of vulnerability is contained in field 40, the severity level in field 45 and the affected versions of the software package are stated in field 50. It is noted that the name of the class "JavaScriptUtils" is contained in field 10 before the dot and the name of the vulnerable function "javaScriptEscape" after the dot.

After parsing and text analysis of the entry for CVE-2013-6430, the LLM identifies the "javaScriptEscape" method in the JavaScriptUtils framework as the name of the software component affected by the CVE. The link to the code repository is identified as https://github.com/spring-projects/spring-framework/commit/7a7df6637478607bef0277bf52a4e0a03e20a248. According to NVD, the type of vulnerability identified is a cross-site scripting (XSS) vulnerability, the affected software versions are from (and including version) 3.0.0 up to version 3.2.2, and finally, the base score for the severity of the CVE is 5.4. This information is extracted by the aforementioned LLM.

By following the link from entry CVE-2013-6430 at NVD to the GitHub source-code repository, the information in FIGS. 2*a*, 2*b* and 2*c* is provided. FIG. 2*a* shows the top part of the webpage with collapsed view of the changed files, FIG. 2*b* shows the file JavaScriptUtils.java, and FIG. 2*c* shows the file JavaScriptUtilsTest.java.

The LLM identifies that the commit referenced from the NVD webpage amended two files, namely i) the file JavaScriptUtils.java containing the amended javaScriptEscape function (see FIG. 2*b*, lines 40 ff.), and the file JavaScriptUtilsTest.java (see FIG. 2*c*). This information can be derived from field 70, the so-called file-tree 80, or by parsing the amended files 90, 95.

It is noted that Java classes ending with "Test.java" (see 2$^{nd}$ file above) are for test purposes only and thus do not contribute to a vulnerability. Thus, it would have been to remove these files from further analysis.

Merging the information from the NVD vulnerability database and the information from the GitHub repository yields that the name of the software component for function "javaScriptEscape" matches on both sources, i.e. the NVD vulnerability database and GitHub. Hence, there is a high likelihood that the function "javaScriptEscape" was affected by the CVE-2013-6430 and that the commit linked to CVE-2013-6430 remedies the vulnerability (see FIG. 3).

FIG. 3 schematically shows that the LLM extracts the function name "javaScriptEscape" from the entry on the NVD website (field 96) and the function name "javaScriptEscape" from parsing the GitHub code repository (field 97).

As an additional step, it is possible to analyze the source-code of the software component likely to be affected by the CVE by the LLM. The level of confidence is even higher if a) the name of the code extracted from the vulnerability database matches the name of the affected source-code extracted from the code repository, b) the name of the code was amended by a commit operation in order to remedy the CVE, and c) the source-code before the amendment, i.e. the unpatched source code or software component, is found to being vulnerable to the vulnerability stated in the vulnerability database.

These three steps are shown in FIG. 4, where i) the entry in the vulnerability database refers to the function javaScriptEscape (field 96) and indicates the type of vulnerability, ii) the changed source-code in the code repository refers to the same function (field 97), and iii) a source-code analysis of the code before patching the function javaScriptEscape indicates a XSS vulnerability as stated in the vulnerability database (field 98). In FIG. 4, the text analysis of the entry in the vulnerability database NVD by the LLM of OpenAI running on Azure platform is depicted in field 96. This analysis yields two results: First, the vulnerable software component is the javaScriptEscape method, and second, the vulnerable software component is vulnerable to Cross site scripting attacks. The analysis of the source-code of the vulnerable software component, i.e. the javaScriptEscape method, in the GitHub source code repository is contained in field 98. This analysis yields that the vulnerable software component before patching is indeed vulnerable to Cross site scripting attacks. Finally, the text analysis of the patched software component, i.e. the javaScriptEscape method patched by a commit operation in the source-code repository GitHub, is contained in field 97. This analysis yields that the javaScriptEscape method was indeed modified by a commit operation. Since there is a match between the names of the vulnerable software component in the vulnerability database NVD and the source code repository GitHub, and there is a match of the type of vulnerability between the entry in the vulnerability database NVD and the result of the source code analysis of the unpatched source code for the software component, there is a very high likelihood that the vulnerability was indeed removed by the patch in the source code repository.

In the following paragraphs, examples for inputs to and the respective outputs from a LLM are given to demonstrate how the claimed computer-implemented method can be executed in a real-world context. For brevity, the following abbreviations are used in the inputs/outputs (called prompts):

TABLE 1

Abbreviations used in the prompts

| Abbreviation | Name | Description | Appearance |
|---|---|---|---|
| D | Description | Contextual vulnerability information (e.g. CVE Description). | Standard, Chain-of-Thought, Least-to-Most, Reasoning-and-Acting (ReAct) |
| E | Explanation | Reasoning step that explains how an answer can be achieved. | Chain-of-Thought |

TABLE 1-continued

| Abbreviations used in the prompts | | | |
|---|---|---|---|
| Abbreviation | Name | Description | Appearance |
| Q | Question | Question that explains a new task or problem description. | Chain-of-Thought |
| A | Answer | Final answer that contains the extracted function information. | Standard, Chain-of-Thought, Least-to-Most |
| IA | Intermediate Answer | Intermediate solution that is associated with a question. | Least-to-Most |
| Tho # | Thought <Number> | Intermediate reasoning step that is associated with a description. | Reasoning-and-Acting (ReAct) |
| Act # | Action <Number> | Intermediate action that is associated with a thought. | Reasoning-and-Acting (ReAct) |
| Obs # | Observation <Number> | Intermediate solution/ answer that is associated with an action. The last observation provides the final answer (like answer). | Reasoning-and-Acting (ReAct) |

With respect to CVE-2013-6430 mentioned above, the following prompts are used to fine-tune the LLM applying Standard Prompting technique:

D: The JavaScriptUtils.javaScriptEscape method in web/util/JavaScriptUtils.java in Spring MVC in Spring Framework before 3.2.2 does not properly escape certain characters, which allows remote attackers to conduct cross-site scripting (XSS) attacks via a (1) line separator or (2) paragraph separator Unicode character or (3) left or (4) right angle bracket.

E: The vulnerability description contains information about an affected function. The affected function is described as javaScriptEscape. Therefore, the answer is 'javaScriptEscape'.

A: [{'T': 'function', 'E': 'javaScriptEscape'}]

Applying Standard Prompting based on CVE-2013-6430 to CVE-2020-13756 renders the following output on OpenAI's GPT-4 Model:

D: The JavaScriptUtils.javaScriptEscape method in web/util/JavaScriptUtils.java in Spring MVC in Spring Framework before 3.2.2 does not properly escape certain characters, which allows remote attackers to conduct cross-site scripting (XSS) attacks via a (1) line separator or (2) paragraph separator Unicode character or (3) left or (4) right angle bracket.

A: [{'T': 'function', 'E': 'javaScriptEscape'}]

D: Sabberworm PHP CSS Parser before 8.3.1 calls eval on uncontrolled data, possibly leading to remote code execution if the function allSelectors( ) or getSelectorsBySpecificity( ) is called with input from an attacker.

A: [{'T': 'function', 'E': 'allSelectors'}, {'T': 'function', 'E': 'getSelectorsBySpecificity'}]

Note that the first two prompts above are used to fine-tune the model, the third prompt "D: Sabberworm . . . " formulates the actual question, and the last prompt "A: [{'T': . . . " is the output from the LLM for CVE-2020-13756. As stated above, the identified type of vulnerable software component is a function, and two potential vulnerable functions were identified, namely 'allSelectors' and 'getSelectorsBySpecificity'.

With respect to CVE-2013-6430, the following prompts are used to fine-tune the LLM applying Chain-of-Thought Prompting technique:

D: The JavaScriptUtils.javaScriptEscape method in web/util/JavaScriptUtils.java in Spring MVC in Spring Framework before 3.2.2 does not properly escape certain characters, which allows remote attackers to conduct cross-site scripting (XSS) attacks via a (1) line separator or (2) paragraph separator Unicode character or (3) left or (4) right angle bracket.

E: The vulnerability description contains information about an affected function. The affected function is described as javaScriptEscape. Therefore, the answer is 'javaScriptEscape'.

A: [{'T': 'function', 'E': 'javaScriptEscape'}]

Applying Chain-of-Thought Prompting based on CVE-2013-6430 to CVE-2020-13756 renders the following output on OpenAI's GPT-4 Model:

D: The JavaScriptUtils.javaScriptEscape method in web/util/JavaScriptUtils.java in Spring MVC in Spring Framework before 3.2.2 does not properly escape certain characters, which allows remote attackers to conduct cross-site scripting (XSS) attacks via a (1) line separator or (2) paragraph separator Unicode character or (3) left or (4) right angle bracket.

E: The vulnerability description contains information about an affected function. The affected function is described as javaScriptEscape. Therefore, the answer is 'javaScriptEscape'.

A: [{'T': 'function', 'E': 'javaScriptEscape'}]

D: Sabberworm PHP CSS Parser before 8.3.1 calls eval on uncontrolled data, possibly leading to remote code execution if the function allSelectors( ) or getSelectorsBySpecificity( ) is called with input from an attacker.

E: The vulnerability description contains information about affected functions. The affected functions are described as allSelectors( ) and getSelectorsBySpecificity( ) Therefore, the answer is 'allSelectors and getSelectorsBySpecificity'.

A: [{'T': 'function', 'E': 'allSelectors'}, {'T': 'function', 'E': 'getSelectorsBySpecificity'}]

Note that the first three prompts above are used to fine-tune the model, the fourth prompt "D: Sabberworm . . . " formulates the actual question, and the fifth and the sixth prompts "E: The vulnerability description . . . " and "A: [{'T': . . . " are the outputs from the LLM for CVE-2020-13756. As stated above, the identified type of vulnerable software component is a function, and two potential vulnerable functions were identified, namely 'allSelectors' and 'getSelectorsBySpecificity'.

With respect to CVE-2013-6430, the following prompts are used to fine-tune the LLM applying Least-to-Most Prompting technique:

D: The JavaScriptUtils.javaScriptEscape method in web/util/JavaScriptUtils.java in Spring MVC in Spring Framework before 3.2.2 does not properly escape certain characters, which allows remote attackers to conduct cross-site scripting (XSS) attacks via a (1) line separator or (2) paragraph separator Unicode character or (3) left or (4) right angle bracket.

Q: Does the description contain information about and affected function?

IA: The vulnerability description contains information about an affected function.

Q: Since the vulnerability description includes information about an affected function, what function is affected in the description?

IA: The affected function is described as javaScriptEscape. Therefore, the answer is 'javaScriptEscape'.

A: [{'T': 'function', 'E': 'javaScriptEscape'}]

Applying Least-to-Most Prompting based on CVE-2013-6430 to CVE-2020-13756 renders the following output on OpenAI's GPT-4 Model:

D: The JavaScriptUtils.javaScriptEscape method in web/util/JavaScriptUtils.java in Spring MVC in Spring Framework before 3.2.2 does not properly escape certain characters, which allows remote attackers to conduct cross-site scripting (XSS) attacks via a (1) line separator or (2) paragraph separator Unicode character or (3) left or (4) right angle bracket.

Q: Does the description contain information about and affected function?

IA: The vulnerability description contains information about an affected function.

Q: Since the vulnerability description includes information about an affected function, what function is affected in the description?

IA: The affected function is described as javaScriptEscape. Therefore, the answer is 'javaScriptEscape'.

A: [{'T': 'function', 'E': 'javaScriptEscape'}]

D: Sabberworm PHP CSS Parser before 8.3.1 calls eval on uncontrolled data, possibly leading to remote code execution if the function allSelectors( ) or getSelectorsBySpecificity( ) is called with input from an attacker.

Q: Does the description contain information about and affected function?

IA: Yes, the vulnerability description contains information about affected functions.

Q: Since the vulnerability description includes information about an affected function, what function(s) is/are affected in the description?

IA: The affected functions are allSelectors( ) and getSelectorsBySpecificity( )

A: [{'T': 'function', 'E': 'allSelectors'}, {'T': 'function', 'E': 'getSelectorsBySpecificity'}]

Note that the first six prompts above are used to fine-tune the model, the seventh prompt "D: Sabberworm . . . " introduces the new case to the LLM, and the last five prompts "Q: Does . . . " to "A: [{'T': . . . " are the outputs from the LLM for CVE-2020-13756. As stated above, the identified type of vulnerable software component is a function, and two potential vulnerable functions were identified, namely 'allSelectors' and 'getSelectorsBySpecificity'.

With respect to CVE-2013-6430, the following prompts are used to fine-tune the LLM applying Reasoning and Acting (ReAct) technique:

D: The JavaScriptUtils.javaScriptEscape method in web/util/JavaScriptUtils.java in Spring MVC in Spring Framework before 3.2.2 does not properly escape certain characters, which allows remote attackers to conduct cross-site scripting (XSS) attacks via a (1) line separator or (2) paragraph separator Unicode character or (3) left or (4) right angle bracket.

Tho 1: I need to find the affected function names from the vulnerability description.

Act 1: Search [The JavaScriptUtils.javaScriptEscape method]

Obs 1: The vulnerability description contains information about "The JavaScriptUtils.javaScriptEscape method". I need to extract the correct information and return it.

Act 2: Extraction [javaScriptEscape]

Obs 2: I am done and ready to return the extracted information in the defined format.

Act 3: Format [javaScriptEscape]

Obs 3: [{'T': 'function', 'E': 'javaScriptEscape'}]

Applying Reasoning and Acting (ReAct) Prompting based on CVE-2013-6430 to CVE-2020-13756 renders the following output on OpenAI's GPT-4 Model:

D: The JavaScriptUtils.javaScriptEscape method in web/util/JavaScriptUtils.java in Spring MVC in Spring Framework before 3.2.2 does not properly escape certain characters, which allows remote attackers to conduct cross-site scripting (XSS) attacks via a (1) line separator or (2) paragraph separator Unicode character or (3) left or (4) right angle bracket.

Tho 1: I need to find the affected function names from the vulnerability description.

Act 1: Search [The JavaScriptUtils.javaScriptEscape method]

Obs 1: The vulnerability description contains information about "The JavaScriptUtils.javaScriptEscape method". I need to extract the correct information and return it.

Act 2: Extraction [javaScriptEscape]

Obs 2: I am done and ready to return the extracted information in the defined format.

Act 3: Format [javaScriptEscape]

Obs 3: [{'T': 'function', 'E': 'javaScriptEscape'}]

D: Sabberworm PHP CSS Parser before 8.3.1 calls eval on uncontrolled data, possibly leading to remote code execution if the function allSelectors( ) or getSelectorsBySpecificity( ) is called with input from an attacker.

Tho 1: I need to find the affected function names from the vulnerability description.

Act 1: Search [the function allSelectors( ) or getSelectorsBySpecificity( )]

Obs 1: The vulnerability description contains information about "the function allSelectors( ) or getSelectorsBySpecificity( )". I need to extract the correct information and return it.

Act 2: Extraction [allSelectors, getSelectorsBySpecificity]

Obs 2: I am done and ready to return the extracted information in the defined format.

Act 3: Format [allSelectors, getSelectorsBySpecificity]

Obs 3: [{'T': 'function', 'E': 'allSelectors'}, {'T': 'function', 'E': 'getSelectorsBySpecificity'}]

Note that the first 8 prompts above are used to fine-tune the model, the 9th prompt "D: Sabberworm . . . " introduces the new case to the LLM, and the last 7 prompts "Tho 1 . . . " to "Obs 3 . . . " are the outputs from the LLM for CVE-2020-13756. As stated above, the identified type of vulnerable software component is a function, and two potential vulnerable functions were identified, namely 'allSelectors' and 'getSelectorsBySpecificity'.

As can be seen from the different prompting techniques above, the essential outputs, which is the name of vulnerable function, are the same irrespective of the prompting technique used. Note, however, that for other cases, one or more prompting technique may be better suited than other prompting techniques. Note that the disclosure is not limited to the specific prompting techniques mentioned in the disclosure.

It is noted that the disclosure is not limited to https://nvd.nist.gov/as the vulnerability database, as multiple other such databases exist, e.g. https://cve.mitre.org/, https://www.cvedetails.com/, https://osv.dev/etc. Furthermore, the disclosure is not limited to the GitHub code repository hosting open-source software code, as many other alternatives are available, such as Bitbucket, SourceForge . . . .

The main steps in identifying vulnerable software according to the first aspect of the disclosure are shown in FIG. 5. After starting the process in step 700 for one CVE, the entry for the CVE on a vulnerability database is accessed in step 710. In this case, the entry is located on the NVD at NIST. The content of the entry, typically a website, is parsed and in step 720 the name of the software component is identified by a Large Language Model, such as OpenAI's GPT 3.5. The name of the vulnerable software component is present in step 730. Additionally to the name, in step 740 a patch is identified by parsing and text analysis of the content of the entry on the CVE DB by the LLM. The identified patch, in most cases a link from the CVE DB to a source-code repository, is present in step 750. By accessing the patch on the code repository, e.g. by following the link, in step 760 the LLM identifies the patch on GitHub. In step 770 it is checked whether the patch noted in the CVE database was identified in the code repository. If the patch was found on the code repository, the name of the software component 730 is reported to the method customer in step 780. The computer-implemented method ends in step 790. It is evident that the method can be executed for multiple entries on the vulnerability database, e.g. by first creating a list of newly identified or amended vulnerabilities within a certain period of time, and then to identify the vulnerable software components.

The main steps in identifying vulnerable software components according to the second aspect of the disclosure are shown in FIG. 6. After starting the process in step 100 for one CVE, the entry for the CVE is accessed in step 110. The content is parsed and text analysis is performed in step 120 by a Large Language Model. By parsing and text analysis the name of the vulnerable software code is identified in step 130. In step 140, the link from the vulnerability database to a patch on a source-code repository is extracted and the link is followed. The patched source code, here referred to as commit in step 150 remedying the vulnerability, is again parsed and a text analysis is performed in step 160 by the Large Language Model. By doing so, the name of the amended software component, e.g. a function, is identified in step 170. Step 180 compares the name extracted from the vulnerability database to the name of the function extracted from the source-code repository. If these names match, the name is reported to the method customer in step 190. The method ends in step 195.

FIG. 7 shows a variant of the main steps in extracting vulnerable software code displayed in FIG. 6. Here it is assumed that by parsing and text analysis of the commit in the source-code repository not one (as in FIG. 6) but multiple, here an integer number i, amended functions are identified. In step 280 it is checked whether the name of the vulnerable function identified in step 230 matches one of the names of the functions identified in step 280. In case the names match, the matching name of the code is reported to the customer of the method in step 290. The method ends in step 295.

FIG. 8 shows a second variant of the main steps in identifying vulnerable software code. After starting the process in step 300 for one CVE, the entry for the CVE is accessed in step 310. The content of this entry is parsed, and text analysis is performed in step 320 by a Large Language Model. By parsing and text analysis the name of the vulnerable software code is extracted in step 330. In addition, the type of vulnerability as specified in the vulnerability database is extracted in step 390. In step 340, the link from the vulnerability database to a patch on a source-code repository is extracted and the link is followed. The patched source code, here referred to as commit in step 350 remedying the vulnerability, is again parsed and a text analysis is performed in step 360 by the Large Language Model. By doing so, the name of the amended function is extracted in step 370. In step 380, it is checked whether the name extracted from the vulnerability database matches the name of the amended function extracted from the source-code repository. In step 400, the unpatched source-code is parsed and a text analysis is performed by the Large Language Model. By doing so, the type of vulnerability is extracted in step 410. In step 420 it is checked whether the type of vulnerability specified in the vulnerability database matches the type of vulnerability of the unpatched source-code. In step 430, an AND operation is performed on the outputs of step 380 (matching names) and step 420 (matching types). If both outputs are TRUE, the name of the vulnerable code is reported to the method customer in step 440. In step 450, the computer-implemented method ends.

FIGS. 9*a* and 9*b* show a scheme of a monitored computing system 500, on which the application 510 runs, and the monitoring server 580. The vulnerability database 590 on the monitoring server 580 holds a list of vulnerable software components. In addition, the database 590 holds identity data for each software component. After having run the disclosed methods for the identification of vulnerable software components multiple times, a list of vulnerable software components is generated. The name of each vulnerable software component is hashed such that the hash value acts as identity data for the SW component. The list of vulnerable software components and the identity data are sent to the monitoring server 580. The monitoring server 580 checks for each software component if it is already contained in the vulnerability database 590. In case the identity data is not yet contained in the database 590, the software component and its identity data are added to the database. The real-time monitoring of software components is described next: It is assumed that the software making up the application logic has loaded the third-party library 520 and has requested to load another third-party library 530. The loading of the third-party library 520 is detected by a transaction sensor 540, the request to load the other third-party library 530 is detected by a loading sensor 550. The information about loading of libraries 520, 530 by the application 510 is transmitted to the monitoring server 580 via the in-process agent 560 or the OS agent 570. The monitoring server 580 can monitor multiple computing systems 500, where each computing system typically comprises multiple applications 510. The information about the applications 510 is sent via a transaction trace and topology data processor 630 to a transaction trace repository 640. The information about the loading/execution of libraries 520, 530 is sent via a library evidence data collector 610 to a topology model 620. As a result, the monitoring server is aware of both the application loading a library and the software component loaded. As stated above, the monitoring server 580 features a vulnerability database 590 in order to detect vulnerabilities of software components, such as functions or methods in libraries. The vulnerability database 590 is queried for the identity data of each loaded software component. If the software component is contained in the database 590, a vulnerability report 670 is issued. In other words, combining the information from the topology model comprising the loaded/executed libraries or functions and the list of vulnerability issues 650 allows the monitoring server 580 to issue vulnerability issues 670. Preferably, before issuing a vulnerability issue, a calculation of vulnerability priority is done by the vulnerability priority calculator 660 allowing sorting of multiple vulnerability issues 670 according to priority.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for identifying vulnerable software from a computer system, comprising:

identifying name of a given software component in a vulnerability database by analyzing text of an entry in the vulnerability database using a large language model, where entries in the vulnerability database have known vulnerabilities;

identifying a patch for the given software component in a source code repository by analyzing text of the entry in the vulnerability database using the large language model;

identifying the patch for the given software component in the source code repository by analyzing text in the source code repository using the large language model;

adapting the large language model using one of standard prompting, chain-of-thought prompting, least-to-most prompting or reasoning-and-acting prompting; and reporting the given software component as being vulnerable in response to identifying the patch for the given software component in the source code repository.

2. The method of claim 1 wherein the patch for the given software component is identified by matching the name of the given software component in the vulnerability database to the name of the given software component in the source code repository.

3. The method of claim 2 further comprises:

identifying type of vulnerability associated with the given software component by analyzing text in the vulnerability database using the large language model;

identifying type of vulnerability associated with the given software component by analyzing text in the source code repository using the large language model; and reporting the given software component as being vulnerable in response to the name of the given software component in the vulnerability database matching the name of the given software component in the source code repository, and the type of vulnerability associated with the given software component in the vulnerability database matching the type of vulnerability associated with the given software component in the source code repository.

4. The method of claim 1 further comprises increasing probability that the given software component is vulnerable in response to identifying the patch for the given software component in the source code repository.

5. The method of claim 1 further comprises patching for the given software component in response to identifying the patch for the given software component in the source code repository.

6. The method of claim 1 further comprises:

retrieving topology entities from a topology model based on the given software component, where the retrieved topology entities are affected by the vulnerability of the given software component, and the topology model is a graph with nodes in the graph representing topology entities in a distributed computer system and edges of the graph representing relationships between the topology entities; and reporting the retrieved topology entities along with the given software component.

7. The method of claim 6 further comprises changing the topology of the computer system in response to reporting topology entities as vulnerable such that the level of risk associated with the vulnerability is reduced by changing the topology.

8. A computer-implemented method for identifying vulnerable software from a computer system, comprising:

identifying name of a given software component in a vulnerability database by analyzing text of an entry in the vulnerability database using a large language model, where entries in the vulnerability database have known vulnerabilities;

extracting a link to a patch for the given software component in a source code repository by analyzing text of the entry in the vulnerability database using the large language model;

identifying name of the given software component in the source code repository by analyzing text of the patch in the source code repository using the large language model;

adapting the large language model using one of standard prompting, chain-of-thought prompting, least-to-most prompting or reasoning-and-acting prompting;

comparing name of the given software component in the vulnerability database to the name of the given software component in the source code repository; and reporting the given software component as being vulnerable in response to the name of the given software component in the vulnerability database matching the name of the given software component in the source code repository.

9. The method of claim 8 further comprises linking to the patch for the given software component in the source code repository using the link for the patch extracted from the entry in the vulnerability database.

10. The method of claim 8 further comprises:

identifying type of vulnerability associated with the given software component by analyzing text of the entry in the vulnerability database using the large language model;

identifying type of vulnerability associated with the given software component by analyzing source code for the given software component in the source code repository using the large language model, where the source code does not include the patch for the given software component; and reporting the given software component as being vulnerable in response to the name of the given software component in the vulnerability database matching the name of the given software component in the source code repository, and the type of vulnerability associated with the given software component in the vulnerability database matching the type of vulnerability associated with the given software component in the source code repository.

11. The method of claim 8 further comprises increasing probability that the given software component is vulnerable in response to in response to the name of the given software component in the vulnerability database matching the name of the given software component in the source code repository.

12. The method of claim 8 further comprises patching for the given software component in response to in response to the name of the given software component in the vulnerability database matching the name of the given software component in the source code repository.

13. The method of claim 8 further comprises:

retrieving topology entities from a topology model based on the given software component, where the retrieved topology entities are affected by the vulnerability of the given software component, and the topology model is a graph with nodes in the graph representing topology entities in a distributed computer system and edges of the graph representing relationships between the topology entities; and reporting the retrieved topology entities along with the given software component.

14. The method of claim 13 further comprises changing the topology of the computer system in response to reporting topology entities as vulnerable such that the level of risk associated with the vulnerability is reduced by changing the topology.

15. A computer-implemented method for identifying vulnerable software from a computer system, comprising:

identifying name of a given software component in a vulnerability database by analyzing text of an entry in the vulnerability database using a large language model, where entries in the vulnerability database have known vulnerabilities;

extracting a link to a patch for the given software component in a source code repository by analyzing text of the entry in the vulnerability database using the large language model;

identifying name of the given software component in the source code repository by analyzing text of the patch in the source code repository using the large language model;

comparing name of the given software component in the vulnerability database to the name of the given software component in the source code repository; and reporting the given software component as being vulnerable in response to the name of the given software component in the vulnerability database matching the name of the given software component in the source code repository, wherein reporting the given software component further comprises:

compiling, by the client computer, a list of vulnerable software components;

for each entry in the list of vulnerable software components, adding identity data to each entry in the list of vulnerable software components;

sending, by the client computer, the list of vulnerable software components to a monitoring server;

for each entry in the list of vulnerable software components, searching for a given entry in a server-side vulnerability database and storing the given entry, along with the identity data for the given entry, in the server-side vulnerability database in response to the absence of the given entry in the server-side vulnerability database.

16. The method of claim 15 wherein the identity data for an entry in the list of vulnerable software components is a hash value of the entry in the list of vulnerable software components.

17. The method of claim 15 further comprises:

identifying execution of the given software component by a client-side application on the client computer;

sending, by the client computer, identity data for the client-side application and identity data for the given software component the monitoring server;

searching for the given software component in the server-side vulnerability database; and issuing a vulnerability report in response to the presence of the given software component in the server-side vulnerability database, where the vulnerability report includes the identity data for the given software component and the identity data for the client-side application.

18. The method of claim 17 wherein the execution of the given software component is identified by one of an in-process agent instructed in the client-side application or an OS agent instrumented in an operating system of the client computer.

19. A non-transitory computer-readable medium having computer-executable instructions that, upon execution of the instructions by a processor of a computer, cause the computer to:

identify name of a given software component in a vulnerability database by analyzing text of an entry in the vulnerability database using a large language model, where entries in the vulnerability database have known vulnerabilities;

extract a link to a patch for the given software component in a source code repository by analyzing text of the entry in the vulnerability database using the large language model;

identify name of the given software component in the source code repository by analyzing text of the patch in the source code repository using the large language model;

adapt the large language model using one of standard prompting, chain-of-thought prompting, least-to-most prompting or reasoning-and-acting prompting;

compare name of the given software component in the vulnerability database to the name of the given software component in the source code repository; and report the given software component as being vulnerable in response to the name of the given software component in the vulnerability database matching the name of the given software component in the source code repository.

* * * * *